ELECTRONIC DISPLAY SYSTEM

Filed April 20, 1962 8 Sheets-Sheet 1

INVENTORS
NORMAN H. TAYLOR
EARLE W. PUGHE
BY CHARLES W. ADAMS
Robert S. Toperzer
ATTORNEY INVENTORS
NORMAN H. TAYLOR
EARLE W. PUGHE
CHARLES W. ADAMS
BY
Robert S. Topezer
ATTORNEY Sept. 7, 1965 N. H. TAYLOR ETAL 3,205,344

ELECTRONIC DISPLAY SYSTEM

Filed April 20, 1962 8 Sheets-Sheet 3

INVENTORS
NORMAN H. TAYLOR
EARLE W. PUGHE
BY CHARLES W. ADAMS

Robert S Toperzer
ATTORNEY

INVENTORS
NORMAN H. TAYLOR
EARLE W. PUGHE
CHARLES W. ADAMS
BY
Robert S Toperzer
ATTORNEY INVENTORS
NORMAN H. TAYLOR
EARLE W. PUGHE
CHARLES W. ADAMS
BY
Robert S Topezer
ATTORNEY

INVENTORS
NORMAN H. TAYLOR
EARLE W. PUGHE
CHARLES W. ADAMS

BY Robert S Topezer

ATTORNEY

INVENTORS
NORMAN H. TAYLOR
EARLE W. PUGHE
CHARLES W. ADAMS

BY Robert S Toperzer
ATTORNEY

Sept. 7, 1965 N. H. TAYLOR ETAL 3,205,344

ELECTRONIC DISPLAY SYSTEM

Filed April 20, 1962 8 Sheets-Sheet 8

INVENTORS
NORMAN H. TAYLOR
EARLE W. PUGHE
CHARLES W. ADAMS

BY Robert S Toperzer
ATTORNEY

United States Patent Office
3,205,344
Patented Sept. 7, 1965

3,205,344
ELECTRONIC DISPLAY SYSTEM
Norman H. Taylor, Reading, Earle W. Pughe, Weston, and Charles W. Adams, Buzzards Bay, Mass., assignors, by mesne assignments, to Control Data Corporation, Minneapolis, Minn., a corporation of Minnesota
Filed Apr. 20, 1962, Ser. No. 189,042
16 Claims. (Cl. 235—154)

This invention relates to electronic display systems, and more particularly, it is concerned with cathode ray tube displays of graphical data. In keeping with the trend toward greater mechanization of data handling processes whereby intelligence can be assimilated and conveyed more quickly and easily, the field of applications for cathode ray tube display systems has undergone rapid expansion. The wide spectrum of activities such as industrial processing, education, and banking to which closed circuit television has been applied is one indication of this.

A drawback of closed circuit television, however, is that for the most part real images or reproductions thereof are the only sources of data that can be used. Accordingly, for those applications where it is more convenient to generate data in other ways, such as with a typewriter, a stylus, and especially with digital computing machines, other schemes for presenting data with a cathode ray tube have been devised. One such scheme is based upon the generation of complex wave forms in response to which the cathode ray tube beam is caused to write directly the information desired to be presented. The combination of a flying spot scanner, with a shadow mask in front of the scanner screen and a phototube behind the mask has been used successfully to obtain a time varying voltage embodying the complex waveforms. The voltage is derived from the photocell in response to variations in the intensity of the light transmitted by the mask to the phototube. Lissajous figures of a diverse character have also been used to convey data in response to specially controlled sinusoidal deflection voltages. A more recent development is the "charactron" tube wherein the beam is shaped to cast an image of a selected character or the like. To form the beam, a matrix of stenciled characters is interposed between the electron gun and the luminiscent screen associated with the tube, and the beam is directed to the region of the matrix where the selected character is located. None of these approaches is sufficiently flexible to provide the multiformity of the graphics which it is often desired to display, however. Even more significant is the fact that the data which is generated in accordance with these schemes cannot be readily manipulated. A common type of manipulation that it is often desired to perform is magnification and minification. Superposition, transposition, counting, and dimensioning are others. Considerably more complicated operations are required to eliminate distortions in aerial photographs and to synthesize three dimensional views from such photographs. Recent technical advances in the satellite field point up the importance of this latter activity. Some of these operations notably magnification and minification can be performed upon analog signals. For the most part, however, conversion of the data to digital form is a more powerful instrument of general applicability.

One well known technique for digitizing graphical data is run length coding. This technique contemplates the assignment of a succession of numbers to represent alternately how much of an area or portion of a line is light, then dark, then light, and so forth. It also implies, in the case of a cathode ray tube display, the generation of a raster by scanning of the cathode ray tube beam. Although significant economies in the way of band width requirements can be obtained by this type of coding, still a very large amount of digital data is needed to generate the display. This means that if the display is to be continually regenerated at a high rate such as thirty times a second so that flicker will be largely eliminated, the band width requirements will be commensurately large. Another scheme that suffers from the same drawback is dot dissection, that is the approximation of graphical data by means of a large number of discretely spaced spots. This follows from the fact that, in the past, the $x$ and $y$ coordinates of each spot have been uniquely and individually coded. Another disadvantage of this type of display is that it is not always easy to read.

Accordingly, it is the general object of the present invention to provide an improved cathode ray tube display system.

A more specific object is to provide a digitally ordered display which makes more efficient use of the digital ordering information.

Another object is to provide a field of display wherein graphical data can be precisely located.

Still another object is to provide a high resolution display which is easy to read.

A further object is to provide a display of the above-mentioned character in which the ordering information is easy to code and manipulate.

A further object is to provide a system which is reliable in operation and which is not as complex as display systems of a similar nature which have been devised heretofore.

A still further object is to provide a display system that makes use of a general purpose memory and is sufficiently flexible that it can be used in diverse system environments.

The novel features of the invention together with further objects and advantages will become apparent from the following detailed description of a preferred embodiment and the drawings to which the description makes reference.

In the drawings:

(FIGURES 2A and 2B are adapted to be arranged side by side with FIGURE 2A to the left to form a single composite drawing.)

Figure 1:
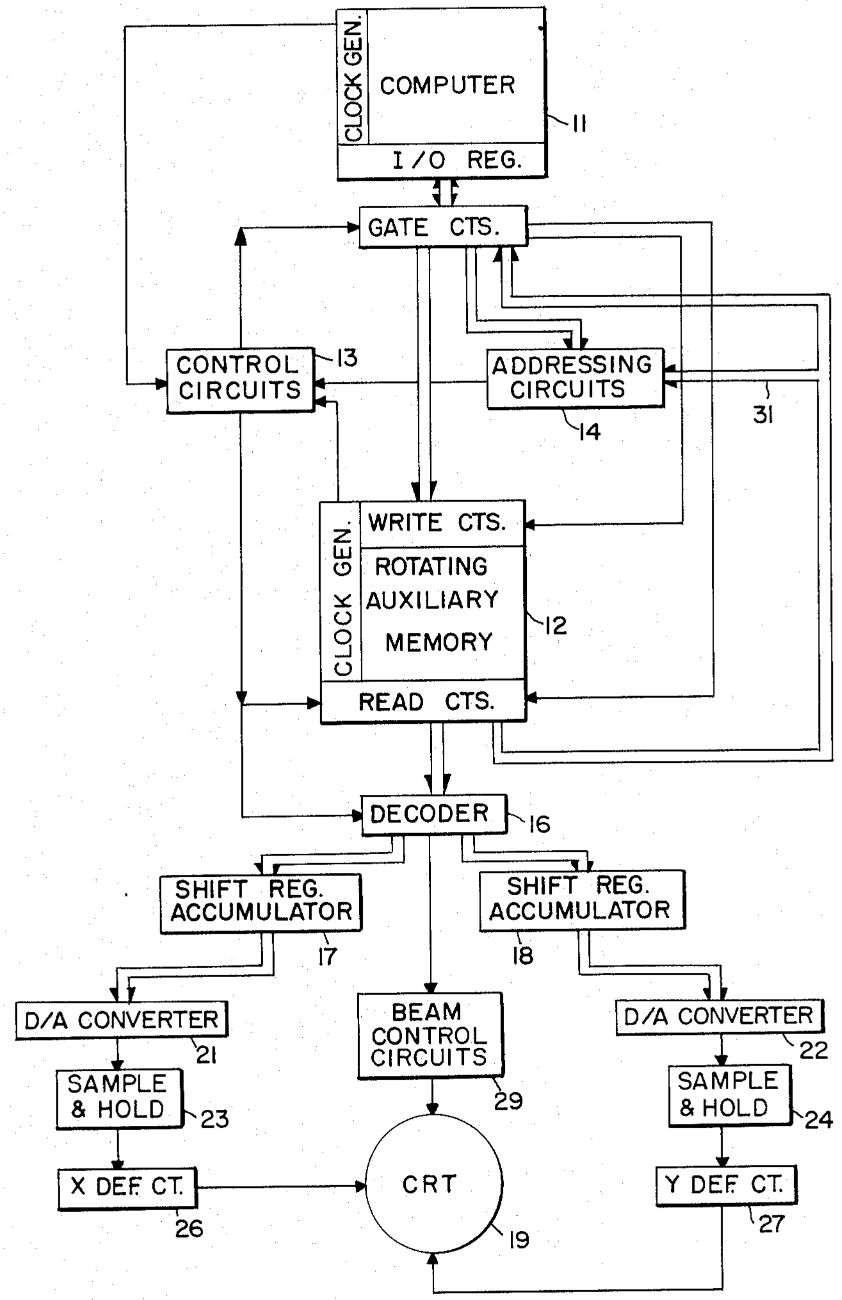
FIGURE 1 is a block diagram illustrating the basic organization of the display system in accordance with the present invention.

With reference now to the drawings, and FIGURE 1 in particular, it will be observed that the source of the data to be displayed in accordance with the invention is an electronic digital computer 11. Although the computer lends added flexibility to the system, in that data processing can be carried out while the display is being generated, the principles of the invention are equally applicable to the display of data from other kinds of sources. For example, the data to be displayed might optionally be obtained from a data storage device such as a magnetic tape. Alternatively, the data might be received from a data transmission device such as a telephone line. It should be understood, therefore, that the scope of the invention extends beyond the environment illustrated herein for purposes of explanation and has broad application in the field of electronic display systems generally.

The data itself comprises digitally coded words representative of graphic indicia, including alpha numeric and other symbolic characters. These words are handled a byte at a time, each byte consisting of four bits which are individually significant. In the "start mode" of operation of the system, one of the two modes of operation employed, each byte is coded to represent an $x$ and a $y$ binary digit and ten such digits are used to specify the $x$ and $y$ coordinates of the origin of a line or other type of graphic data to be displayed. In the "normal mode" of operation of the system which obtains after an origin has been so specified, the bytes are adapted to represent selected ones of a catalog of line segments which are used to form the line. As will be explained more fully hereinafter, there are thirty-two possible line segments to choose from, and the number of segments used to form a particular line or other piece of graphic data depends on the length of the line. It is sufficient to understand at this point that the first line segment is located in accordance with the origin defining bytes employed in the start mode, and the line segments are disposed end to end in consecutive order, having been selected in accordance with the segment defining bytes.

Associated with the computer is a rotating auxiliary memory device 12 incorporating appropriate read and write circuitry whereby digital data can be alternatively recorded and regenerated. To synchronize the transfer of data from the computer to memory, appropriate control circuitry 13 is provided which responds to clock signals and address comparison signals. The clock signals are derived from the respective clock generators of the computer and the auxiliary memory. The address comparison signals are derived from addressing circuitry 14 wherein addresses corresponding to selected locations in memory are compared with the actual sequence of addresses presented during each revolution of the auxiliary memory device.

A preferred type of auxiliary memory device is the Model TMM-31 magnetic disc system manufactured by Telex, Inc. of St. Paul, Minnesota. In its basic form, this memory makes use of a single disc which is coated on each side with magnetizable material. The disc is 31 inches in diameter and is rotated at a nominal speed of 1,800 revolutions per minute. Each side or surface of the disc is adapted to store approximately one half million bits of information on eight concentric tracks. Another 248 tracks per side are available for general data storage. In addition to these data tracks, the disc is provided with an index track, to signal the arrival of the disc at a predetermined angular position once during each revolution; a timing track from which is derived a continuous train of clock pulses whose repetition rate is synchronized with the rotational speed of the disc; and a sector track which generates signals at regular angular intervals corresponding to 22½° of rotation of the disc. The latter is used for locating selected sectoral portions of the disc with which blocks of data are exchanged.

A plurality of read-write heads are used with the disc so that data can be recorded on, and regenerated from a number of the tracks simultaneously. A double frequency nonreturn-to-zero method of recording is used in order to enhance the signal to noise ratio of the device. That is to say, each track is magnetized so that a flux change is produced at each instant of time a clock pulse occurs, irrespective of the sense of the data recorded. To record ONES, additional flux changes are produced midway in the intervals between clock pulses.

The bytes of data which have been stored in the auxiliary memory for subsequent display are read into a decoder 16 which may, by way of example, comprise a conventional diode matrix. From these bytes of data, binary signals are derived and entered in a pair of registers 17 and 18. Each of the registers is adapted to operate in the start mode as a shift register, and in the normal mode of operation of the system as an accumulator wherein binary numbers representative of deflection voltages for a cathode ray tube (CRT) 19 are temporarily stored. A tube with a seventeen inch (diagonal) screen has been found to work out well in actual practice.

To convert the binary numbers in the registers to appropriate deflection voltages, there are provided $x$ and $y$ digital-to-analog converters 21 and 22. Each converter includes an input register of flip flops, a corresponding series of current generators, and an adding network. By means of sample and hold circuits 23 and 24, the deflection voltages derived by the adding networks are applied to the $x$ and $y$ deflection circuits 26 and 27 for the CRT. The deflection circuit parameters upon which the time constants of the circuits depend, are established in accordance with the transfer rate of the bytes for optimum linearity and smoothness of the trace. The sample and hold circuits are used to overcome the transient effects of the jam transfer of digital signals from the decoder 16 to the registers 17 and 18. As shown, decoder 16 also serves to provide signals to beam control circuits 29 for blanking and controlling the intensity of the beam.

A type of computer that has been used successfully in accordance with the invention is the Model PDP-1 manufactured by the Digital Equipment Corporation of Maynard, Massachusetts. This is a high speed solid state machine adapted to incorporate a stored program. The storage capability of the machine resides in a magnetic core memory which is adapted to store 4,096 words, 18 bits in length each. Parallel processing of the bits makes possible a computation rate of 100,000 additions per second with a memory cycle time of five micro-seconds. Also included with the machine is an input-output register that is especially adapted to accommodate additional gates whereby an auxiliary memory such as disc 12 can be readily linked with the machine. This will appear more clearly from the description of the circuit details illustrated in the remainder of the figures to be described hereinafter.

A simple example of the drawing of a line will best serve to illustrate the basic operative scheme of the invention. Let it be assumed, for example, that a horizontal line, one inch long, is to be displayed, beginning at a point three quarters of the way across the tube face from left to right. Let it further be assumed that the line is centered vertically. To generate a display of the line, in accordance with the invention, the digital data by which the line is characterized is first recorded on a predetermined sector of the disc. The sector is identified by an address word which is deposited in the $I/O$ register together with a ONE bit in the lowest order stage of the register to signify that a writing operation is to take place. Thereafter, the transfer of this address word from the $I/O$ register to the addressing circuits follows automatically in response to the sequence of internally generated commands, which the stored program has initiated.

The next word deposited in the $I/O$ register provides information concerning the location of the origin of the line to be displayed. This is read out when the selected sector is about to pass beneath the write heads associated with the disc. To signal this fact, there is transmitted to the addressing circuits by way of a line 31 from the read circuits, an address word which matches that which was already entered. As a result, control circuits 13 are enabled upon the occurrence of the next disc clock pulse to read out a portion of the information word then standing in the *I/O* register and record it on the disc. As will appear more clearly from the description of the more detailed figures hereinafter, readout, that is transfer of the information word to the auxiliary memory disc, is accomplished a byte at a time, each byte consisting of four bits. When all four of the bytes of the first word have been transferred to the disc, then the next word is deposited in the *I/O* register and transferred a byte at a time and so forth until all of the bytes necessary to characterize the line to be displayed have been recorded. Specifically, ten bytes are necessary to locate the origin of the line to an accuracy of better than one hundredth of an inch and to generate the necessary deflection voltages for the display thereof.

The translation of the bytes into appropriate analog voltages to effect this result begins with the enabling of the read circuits associated with the disc to read out one byte at a time to the decoder 16. The first byte calls for the start mode of operation of the system wherein the registers 17 and 18 are enabled to operate as shift registers. The next ten bytes provide the *x* and *y* displacement data necessary to locate the origin of the line to be displayed. To define these displacements in digital form, each byte is translated by the decoder into an *x* and a *y* digit and the digits are successively entered in the shift registers 17 and 18. After entry of each individual digit, the same is shifted one place to the left in order to make room for the next succeeding digit and so on until the register is full; that is until all ten bit positions or stages of the registers are occupied. The numbers then standing in the registers specify the *x* and *y* coordinates of the origin of the line. In the specific example chosen, register 17 will have ONES digits in its two highest order stages representing an *x* displacement of the origin of ½ plus ¼ or ¾. Register 18, on the other hand, will have a ONES digit in its highest order stage only, to reflect the fact that the origin of the line is vertically centered. These numbers are translated into suitable analog voltages by the converters 21 and 22 and the analog voltages are applied by means of the sample and hold circuits 23 and 24 to the *x* and *y* deflection circuits. In this way, the cathode ray tube beam is directed to the point corresponding to the origin of the line to be displayed. Those skilled in the art will, of course, recognize that suitable voltage amplifiers and drivers are also provided for this purpose.

Next, the CRT beam is unblanked and the normal mode of operation of the system is specified by the byte code whereby registers 17 and 18 are converted to an accumulator configuration. The remaining bytes serve to provide increments to the numbers in the accumulators corresponding to the line segments which go to make up the line to be displayed.

The manner in which this is accomplished can best be understood in terms of a single one of the increments, for example the first. In response to the first byte following that which is used to define the normal mode, there is produced by the decoder 16 a digital signal on a selected one of the input lines to the *x* register 17. This signal will have a maximum weight because the segment extends in the *x* direction only, and to reflect this weight in the increment, the selected input line is adapted to operate upon the $2^2$ stage of the register. No signal will appear on any of the input lines to the *y* register 18 because of the initial assumption that the line has no vertical displacement. In consequence, a new number will be caused to appear in the register 17 only, from which a new analog voltage will be derived. After a predetermined delay to permit register 17 to settle, then the new analog voltage is applied to the deflection circuit 26 causing the beam to move from the origin of the desired line to the terminus of the first line segment and to produce a trace of the line segment in the course of its movement. In like manner, the character of the next succeeding line segment is specified and a new number is produced in the accumulator 17. This too is converted into an appropriate deflection voltage whereby the next segment is traced and so forth until traces of four such segments have been generated end to end, the terminus of the fourth segment corresponding to that of the line. As the operation is repeated once for each revolution of the disc, the line is regenerated 30 times a second so that an essentially flicker-free display of the line is presented to view.

Figure 2A:
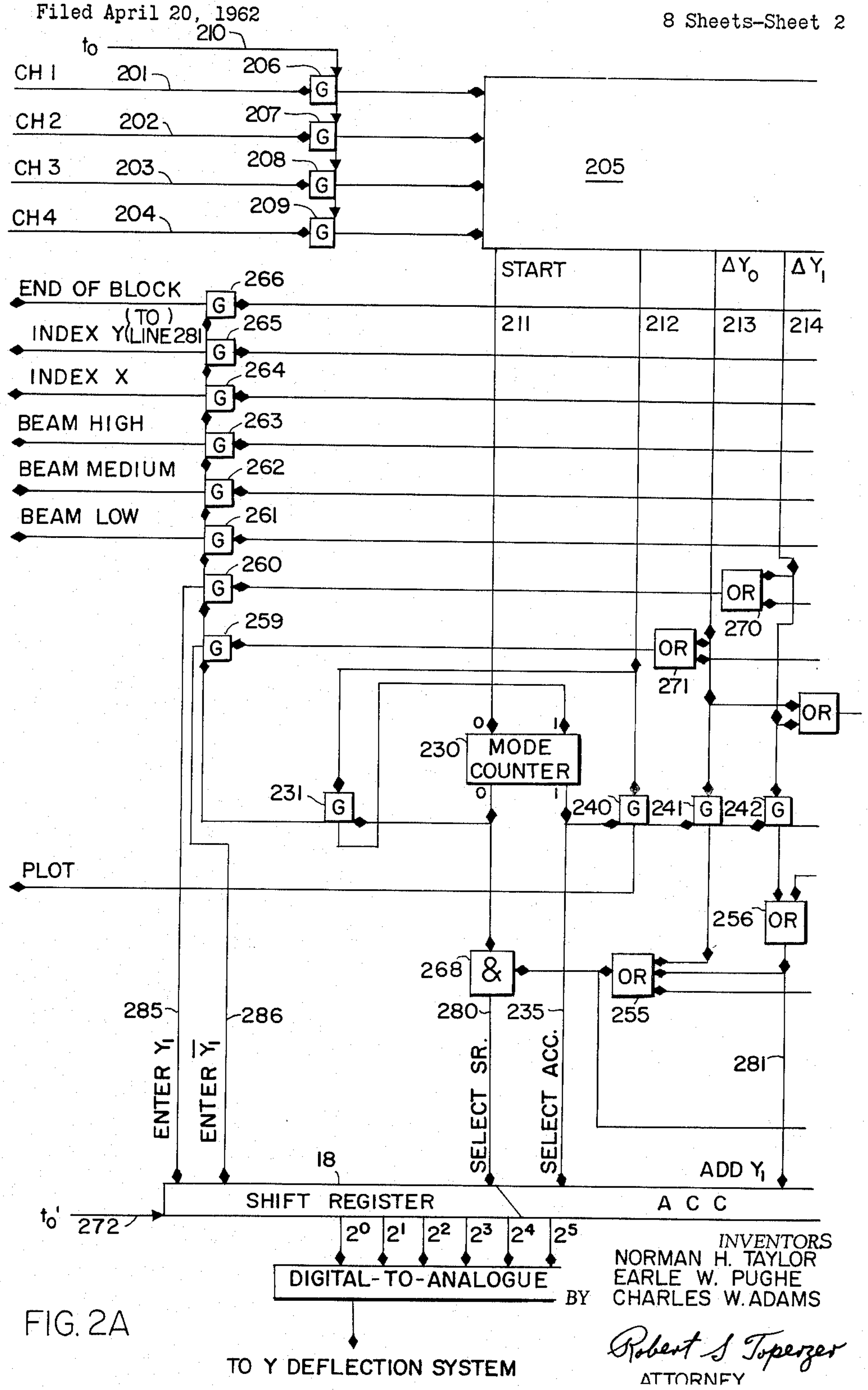
FIGURES 2A and 2B are logical block diagrams illustrating the decoder and associated circuitry employed in the system.
Figure 2B:
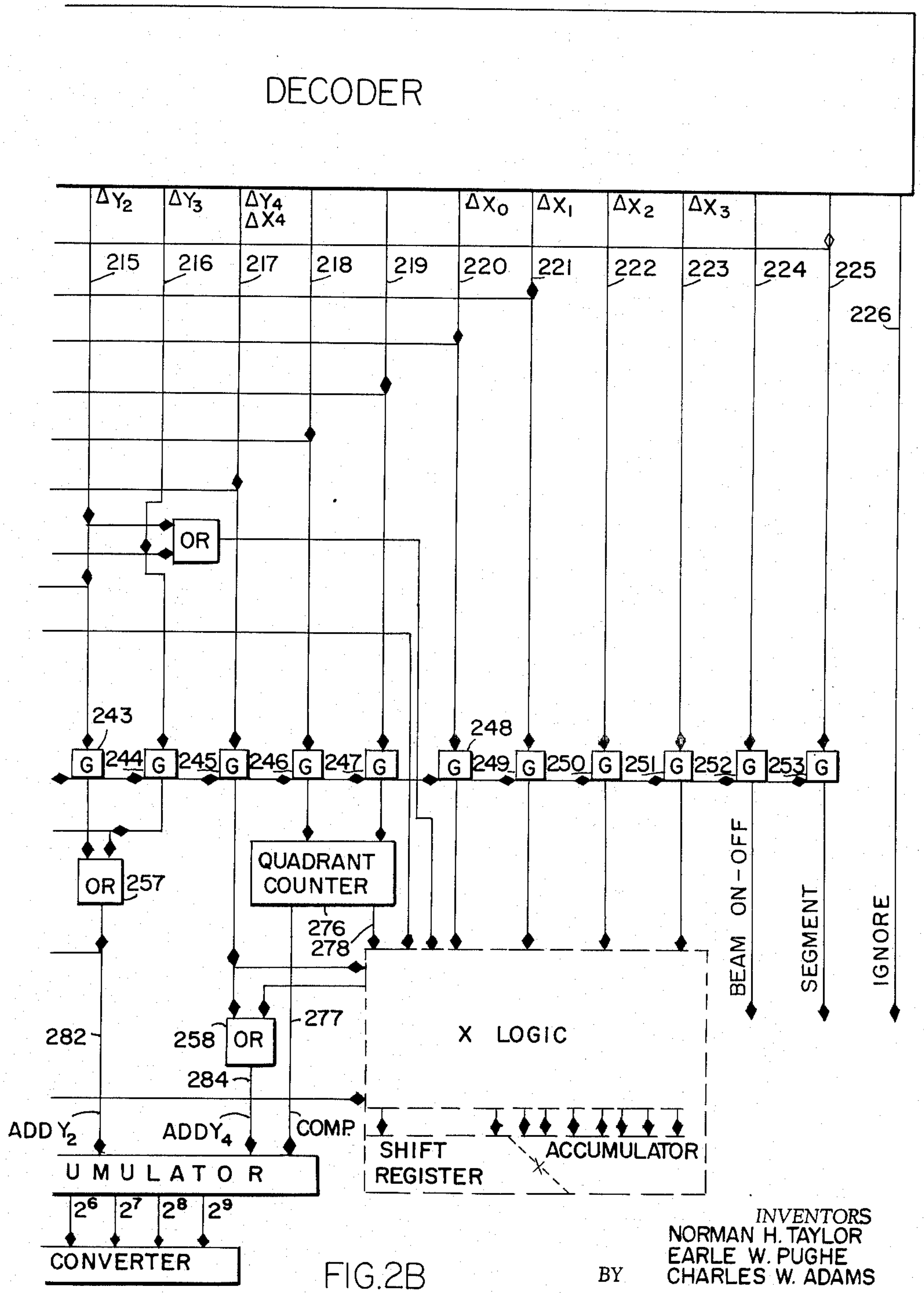

With reference now to FIGURES 2A and 2B wherein the decoder logic is shown more in detail, it will be observed that the numerals 201–204 designate the lines carrying data from four data tracks on the disc. The data tracks, it will be recalled, are formed as concentric rings on the disc and four bits are read out at a time, one from each track to form a byte.

As shown, the bytes are decoded in a decoder 205 which has four input circuits corresponding to the four data tracks. Included in these input circuits are gates 206–209. Gates 206–209 are conditioned by a clock pulse $t_0$ on a line 210 which produces a strobing action upon the individual bits of a byte whenever the byte is to be entered in the decoder.

Decoder 205 has sixteen output lines 211–226, one for each code combination which a byte may represent. The line which is uniquely selected in accordance with the byte code has impressed thereon a minus three volt level signal. Unselected lines are at zero or ground potential. When the system is operating in the normal mode, eleven of the decoder output lines 213–223 are logically associated with the selection of one of the thirty-two different line segments. These segments are defined in terms of *dx* and *dy* components. Thus, a level on one of the 213–216 defines a *dy* component of either zero, one, two, or three units, respectively. Similarly, levels on lines 220–223 are used to define *dx* components of zero, one, two, or three units, respectively.

When the selected *dy* component is either zero, one, two, or three, the *dx* component is always four. When the *dx* component is either zero, one, two, or three, the *dy* component is always four. These latter relations are implemented by logical circuitry associated with the decoder to be explained more fully hereinafter. A level on output line 217 specifies that both *dx* and *dy* comprise four units of length. The signs of the components, whether positive or negative, are specified by level signals on lines 218 and 219.

The mode of operation of the system, whether it be "normal" or "start," is determined in accordance with the count standing in a mode counter or flip flop 230. Flip flop 230 has two input lines, ONE and ZERO. The ZERO line is connected to the 211 output line of the decoder 205. The ONE line is connected to the 212 output line of the decoder through a gate 231. Gate 231 is conditioned by the ZERO output of the flip flop 230. In this way, the byte code tiself is used to specify the mode of operation of the system. In the normal mode, the flip flop is in the ONE state and a minus three volt level is present on its ONE output line. This level is used to condition a series of gates 240–253 to pass output level signals from the decoder output lines 212–225 and to enable the register 18 to operate in an accumulator configuration.

Gated signals from lines 224 and 225 are used to initiate control functions. Thus, when a level is raised on line 224 and gate 252 is enabled, the state of the beam, as on or off, is changed. Gate 253, when it is enabled, passes signals for counting the number of line segments that have been displayed. Signals from decoder output line 212 are passed to a line designated "plot" when gate 240 is enabled in the normal mode. These signals momentarily switch the beam on when it is desired to produce a point instead of a line segment. Finally, it will be observed that line 226 is ungated and is designated "ignore." This means that no action is initiated when line 226 is up which is a way of marking time.

Signals on line 213–223 are passed to the aforementioned logical circuitry and thence to the $x$ and $y$ registers 17 and 18 described in FIGURE 1, the logical circuitry for simplicity being combined with the decoder organization in FIGURE 1. In FIGURES 2A and 2B only the logical circuitry associated with the $y$ register has been shown in detail. Included therein are OR circuits 256, 257, and 258. The inputs to OR circuit 256 comprise the gated outputs from the 214, 216 decoder output lines. The inputs to OR circuit 257 comprise the gated outputs from the 215, 216 decoder output lines; and the inputs to OR circuit 258 comprise the gated output from the 217 decoder line and the output of an OR circuit forming a part of the $x$ logic (not shown) which is the counterpart of an OR circuit 255 in the $y$ logic. The outputs from the OR circuits 256, 257, and 258 serve as the respective add $Y_1$, $Y_2$, and $Y_4$ input lines 281, 282, and 284 to the register 18. The outputs from OR circuits 256 and 257 are also employed together with the gated output from the 213 decoder line as inputs to OR circuit 255 which is used in the start mode in a manner to be explained.

To initiate the start mode, a level is raised on line 211 of the decoder so that the ZERO output line of flip flop 230 is up. This level is used to condition a series of gates 259–266. The input lines to gates 261–266 are connected to the decoder output lines 217–221 and 225. Signals passed by the gates initiate various additional control functions. As its functional designation implies, the output line from gate 261 is connected to a low intensity input to the cathode ray tube. Similarly, the output lines from gates 262 and 263 are connected to CRT display inputs by means of which medium and high level beam intensities are established. Signals on the index $x$ and index $y$ lines from gates 264 and 265 serve to add ONES to the contents of the $x$ and $y$ accumulators. This makes it possible to modify the length of a line or line segment in a precise manner. A signal passed by gate 266 signifies that the end of a block of data has been reached. In response thereto, both the decoder and the display system are disabled so that stale or unwanted data will be ignored.

Another use to which the decoder output signals are put in the start mode is to designate the starting point or origin of each line defining combination of end to end line segments. For this purpose, the register is adapted to operate as a shift register in response to a level on the ZERO output line of the mode flip flop 230 and on the output line from OR circuit 255. An AND circuit 268 having an output line 280 is provided to perform this logical function. A ONE bit to be entered in the register in the start mode is derived from either the 214 or 216 output lines from the decoder by means of an OR circuit 270. The one bit signal is entered by way of gate 260 which has an output line 285. A ZERO bit is derived from either the 213 or 215 output lines by means of an OR circuit 271. The ZERO bit signal is entered by way of gate 259 whose output line is designated 286. After a ONE or a ZERO bit has been entered, it is shifted by a pulse $t_0'$ on line 272 and the process is repeated until a total of ten bits have been entered. The output lines from the register 18 are coupled to the digital-to-analog converter whose function it is to provide an analog $y$ deflection voltage for the vertical deflection system of the CRT.

There remains to be described one other important aspect of the accumulator converter function and that is the determination of whether a $dx$ componet is positive or negative. For this purpose there is provided a scale-of-four counter 276 which is adapted to count up or down in response to output signals from a selected one of the two decoder output lines 218 and 219. The count held in the counter whether it be one, two, three or four is logically associated with one of the four quadrants normally used in a conventional system of Cortesian coordinates. The counter has two output lines 277 and 278 to signify the count. The first quadrant is signified when neither line is up at the count of one; the second quadrant is signified when the $-x$ line 278 is up at the count of two; the third quadrant is signified when both lines are up; and the fourth quadrant is signified when the $-y$ line 277 is up at the count of four. Signals carried by the lines 277 and 278 are passed to the $x$ and $y$ registers wherein appropriate complementing operations are performed to reflect the changes of sign. This will be explained more in detail in connection with FIGURE 3.

Figure 3:
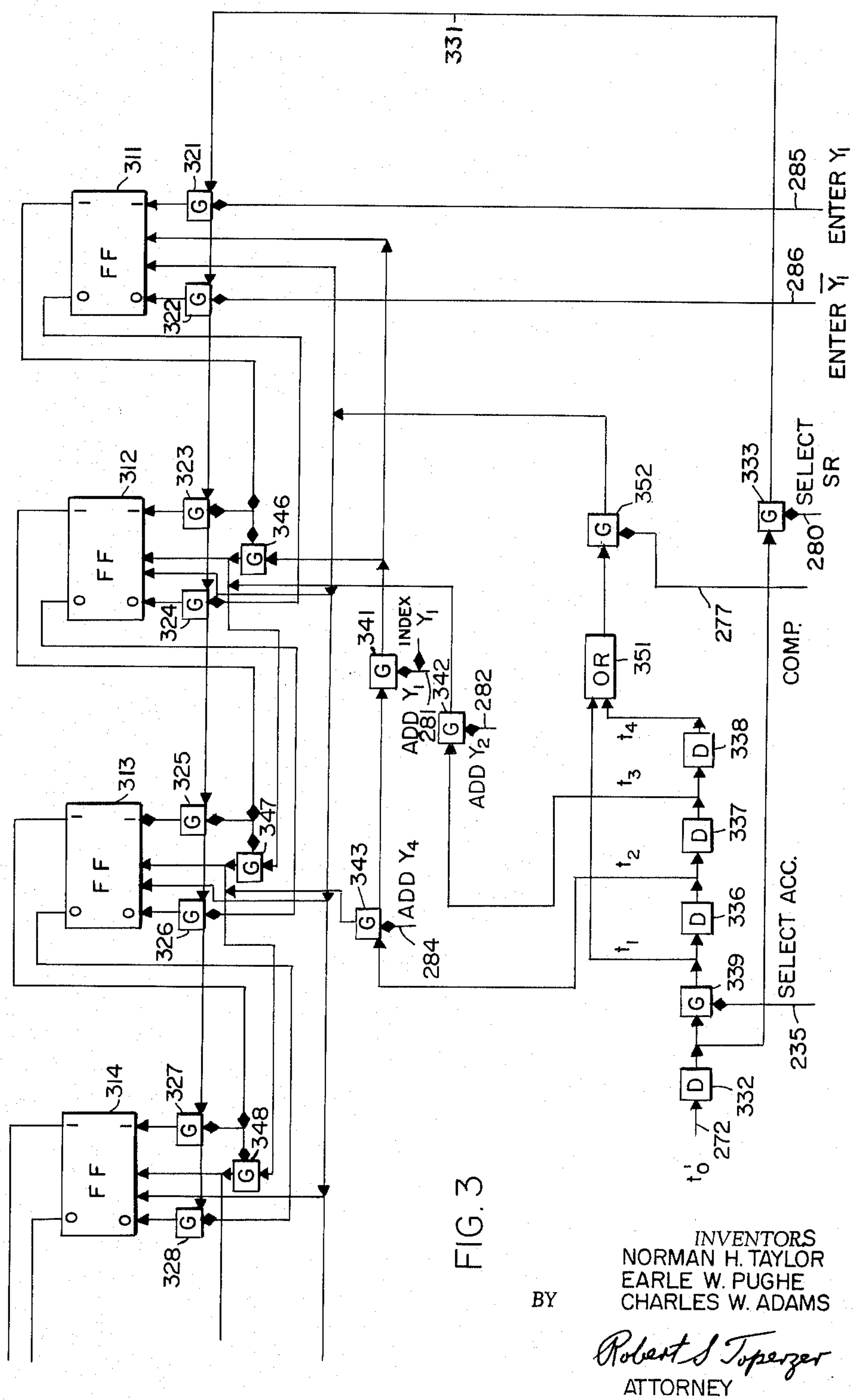
FIGURE 3 is a logical block diagram of the accumulator and shift register employed in the system.

In FIGURE 3, the combination shift register and accumulator register 18 of FIGURES 2A and 2B is shown more in detail. Register 17 is substantially identical. With reference now to FIGURE 3, it will be observed that the register stages are comprised of flip flops 311-314 having a pair of complementing inputs in addition to conventional ONE and ZERO input and output circuits. The complementing inputs are functionally identical but are effectively isolated from one another so that the respective circuits associated therewith are able to operate independently of one another. The register actually has ten stages, only four of which have been shown in order to make it easier to explain and understand the logic involved in the two modes of operation of the register, namely the shift register mode which is used in carrying out the start mode of operation of the system, and the accumulator configuration which is used in conjunction with the normal mode of operation of the system.

To implement shift register operations, a series of gates 321–328 are provided which interrelate each individual register stage with its next higher order counterpart. Thus, gates 323 and 324 are selectively conditioned by the respective ONE and ZERO output sides of the lowest order stage 311 to set the next stage 312 to ONE or ZERO on signal from a shift pulse on a line 331. In like manner, gates 325 and 326 are connected between stages 312 and 313; and gates 327 and 328 are connected between stages 313 and 314. The lowest order stage 311 is provided with input signals by way of gates 321 and 322 which are conditioned by the $Y_1$ and $\overline{Y}_1$ lines 285 and 286 described in connection with FIGURES 2A and 2B. These input signals are produced in time coincidence with the shift pulses on line 331 by virtue of the fact that these gates are likewise sensed by the shift pulses.

The shift pulses are derived from $t_0'$ pulses on line 272 after they have been delayed for a predetermined interval by means of a delay unit 332. The latter is connected to the input side of a gate 333 which is conditioned by signals on line 280, the line which provides a level to signify that the shift register mode of operation has been ordered.

In addition to the delay unit 332, there are provided for the accumulator configuration a series of delay units 336-338 which are connected to one another in cascade and to delay unit 332 by means of a gate 339. Gate 339 is conditioned by signals on line 235 which signifies that the accumulator configuration has been ordered and that signals specifying $y$ component magnitudes of line segments are to be entered in the register. From FIGURES 2A and 2B, it will be recalled that by means of the byte decoder logic levels are selectively raised on the three register incrementing lines 281, 282, and 284, the first of which is used to signify one unit of length in the $y$ direction, the second of which is used to specify two units of length in the $y$ direction, and the third of which is used to specify four units of length in the $y$ direction. Three units of length are specified by a combination of signals on the lines 281 and 282.

Connected to the lines 281, 282, and 284 are the conditioning input circuits of gates 341, 342, and 343. Gates 341 and 343 are sensed by pulses from delay unit 336 while gate 342 is sensed by pulses from the succeeding delay unit 337. The output circuit of gate 341 is connected to the input circuit of a gate 346 which is conditioned by the ONE side of flip flop 311. The output circuits of gate 342 and 346 are connected in common to one of the complementing lines associated with flip flop 312 and to the input circuit of a gate 347. Gate 347 is conditioned by the ONE side of flip flop 312 and has its output circuit connected in common with that of gate 343 to one of the complementing lines associated with flip flop 313 and to the input circuit of a gate 348. Gate 348 is conditioned by the ONE side of flip flop 313 and has its output circuit connected to one of the complementing lines associated with flip flop 314 and to the counterpart gate associated with the next higher order register stage.

Finally, there is provided an OR circuit 351 which serves to channel the pulses from both gate 339 and delay unit 338 to the input circuit of a gate 352. Gate 352 is conditioned by signals on line 277 which cause the register to be complemented. To this end, the output circuit of gate 352 is connected in common to the remaining complementing lines of all the register stages.

In the start mode of operation of the register, a level is raised on line 280 and on one of the lines 285, 286 depending on whether the first origin defining bit to be entered in the register is a ONE or a ZERO. As a consequence, one of the gates 321 or 322 is conditioned to enter the appropriate bit in the first register stage upon the occurrence of the first shift pulse on line 331. After the flip flop 311 has been appropriately set to represent the first bit, a second bit signal is then caused to appear on one of the lines 285, 286 and, in response to the next shift pulse, is entered in the lowest order register stage. However, at the same time flip flop 311 is appropriately set to reflect the sense of this bit, the first bit that was entered, is shifted into the next higher order stage. If it be assumed, for example, that the flip flop 311 was initially set to ONE, then upon the occurrence of this second shift pulse, gate 323 passes a pulse to the one input of flip flop 312 and sets it to ONE. In like manner succeeding origin defining bits are entered in the lowest order register stage and then shifted into succeedingly higher order register stages until a total of ten bits have been entered in the register.

In the ensuing normal mode of operation, let it be assumed that the first line segment to be displayed has a $y$ component whose magnitude corresponds to one unit of length. In this case, levels are raised on lines 234 and 281 which condition gates 339 and 341 to pass the next $t_0'$ pulse by way of delay units 332 and 336 to one of the complementing inputs of flip flop 331. As is apparent to those skilled in the art, the complementing of flip flop 331, comprising the lowest order stage has the effect of incrementing the number standing in the register by ONE. If flip flop 311 was already set to the ONE state, then gate 346 will be conditioned to complement flip flop 321 which has the effect of carrying ONE from the lowest order stage to the next higher order stage comprising flip flop 312. In like manner carries to flip flops 313 and 314 will be provided wherever necessary by means of gates 347, 348, and their counterparts associated with the higher order register stages.

In the case of an increment of two units of magnitude, a level is raised on line 282 which conditions gate 342 to pass a pulse to one of the complementing inputs of flip flop 312, the added unit of magnitude being reflected in the fact that the pulse operates upon flip flop 312 in this case instead of flip flop 311. This pulse is derived from delay unit 337 at a time subsequent to the pulse which is used to sense gate 341 in order that signals specifying both one unit and two units can be accommodated simultaneously. In this way, $y$ components having three units of magnitude are entered in the register and the carries which are generated as a result of the one unit signal are propagated in advance of the two bit incrementing process. That is to say, delay unit 337 provides a sufficient amount of delay to insure that the carry process resulting from the entry of a ONE bit has gone beyond flip flop 312 by the time the two bit signal is entered therein.

Signals connoting $y$ components of four units of length are entered on line 284 which conditions gate 343. Gate 343 is sensed by pulses from delay unit 336, the same as in gate 341. Pulses passed by gate 343 serve to complement flip flop 313. The reason that gate 343 is sensed at the same time as gate 341 is that four units of magnitude is the greatest amount by which the register can be incremented at any one time and hence, no carries will be propagated from lower order stage in this case.

Thus far, incrementing of the reigster in the positive sense only has been considered. To increment negatively, that is to effect a substraction operation as required when line segments in the third and fourth quadrants are to be produced, all of the flip flops comprising the register stages are complemented simultaneously. Next the increment is entered in the usual manner; and then a final complementing operation is caused to take place.

The justification for this method of subtraction is as follows:

$$A-B=-(-A+B)$$
$$(3)\ (1)\ (2)$$

wherein (N) connotes the order of the individual steps. For example, let it be assumed that four units of magnitude are to be subtracted from the contents of the register. Pursuant to this example, gate 352 is conditioned by means of a signal on line 277 and as a result the next $t_0'$ pulse having first traversed gate 339 and OR circuit 351 is passed to one each of the complementing lines associated with the individual register stages to complement them. Following this first complementing operation by an interval determined by the delay introduced by delay unit 336, gate 343 is sensed. By means of gate 343, flip flop 313 is selectively complemented again, which, in effect, adds four units of magnitude to the contents of the register. Finally, the $t_0'$ pulse having traversed delay units 337, 338 and OR circuit 351 is passed by gate 352 to all of the aforementioned complementing lines once again which completes the subtraction process.

Figures 4, 5:
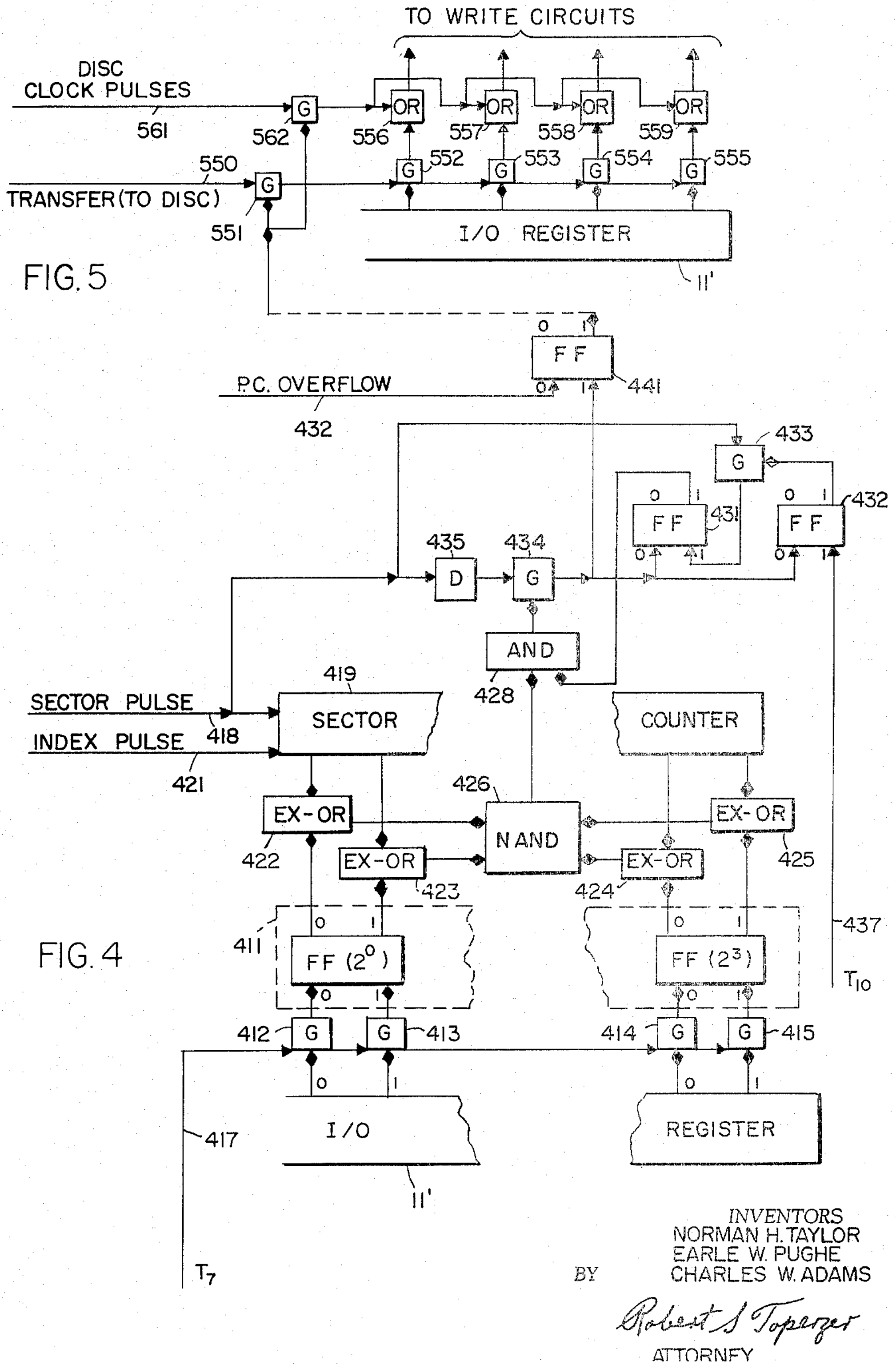
FIGURE 4 is a logical block diagram of the sector addressing circuits incorporated in the system.
FIGURE 5 is a logical block diagram of certain data transfer logic associated with the sector addressing circuitry.

FIGURES 4 and 5 illustrate the way in which four bit word transfers from the computer *I/O* register 11' to the disc memory are initiated. From FIGURE 4, is will be observed that the *I/O* register comprises a plurality of stages or orders each of which has a ZERO and a ONE output line associated with it. Only two of these stages have been illustrated for the sake of clarity, the $2^0$ and the $2^3$ stages.

Associated with the *I/O* register is a sector address register 411 of four stages, $2^0$ through $2^3$ which form a part of the addressing circuitry 14 of FIGURE 1. Each stage is comprised of flip flop having individual ONE and ZERO inputs and outputs. Connected to the inputs by way of gates 412–415 are the corresponding outputs of the *I/O* register. Gates 412–415 are enabled by timing pulses $t_7$ on a line 417 from the computer.

Sector pulses from the disc address track are passed by a line 418 to a counting register 419 whose contents reflect the angular position of the disc. The counter is reset after each disc revolution by an index pulse on a line 421 emanating from the index track of the disc. It will be recalled that one index pulse is stored on the index track at a refernce location corresponding to ZERO disc clock time. The sector pulses are stored on the sector address track at equal angular intervals of 22½°, so that sixteen sector pulses are generated during each revolution of the disc.

The count of the sector pulses standing in the counting register is compared with the sector address specified by the contents of the *I/O* register by means of exclusive OR circuits 422–425 and a NAND circuit 426. Specifically, the ZERO output line from the first stage of the address register and the ZERO output line from the first stage of the sector counting register are functionally related by exclusive OR circuit 422; the ONE output line from the first stage of the sector address register and the ONE output line from the first stage of the counting register are functionally related by exclusive OR circuit 423 and so forth; that is one exclusive OR circuit is provided to functionally relate each pair of corresponding outputs from the sector address and counting registers. In turn, NAND circuit 426 serves to produce a signal which is a NAND function of the output signals from the exclusive OR circuits 422–426. These signals are applied to one of the two input circuits of an AND circuit 428.

The other input circuit to AND circuit 428 is served by the ONE output of a flip flop 431. Flip flop 431 and a flip flop 432 together with gates 433, 434 and a delay unit 435 comprise a synchronizer for the sector pulses and timing pulses $T_{10}$ carried by a line 437 from the computer clock generator. Line 437 is connected to the ONE input side of flip flop 432 whose ONE output side enables a gate 433 to pass sector pulses to the ONE input side of flip flop 431. The ZERO sides of the flip flops 431 and 432 are coupled to the sector pulse line 418 by way of delay unit 435 and gate 434. Gate 434 is conditioned by output signals from AND circuit 426. Finally there is provided a flip flop 441 which is acted upon by the synchronizer by having its ONE input side connected to the output side of gate 434. Flip flop 441 is reset to ZERO by signals on a line 432 from the computer evidencing that the program counter has reached its counting limit.

In operation, preparatory to a word transfer from the computer to the disc memory, the address of the sector of the disc memory to which a block of words is to be transferred is programmed into the *I/O* register, and upon the occurrence of a $T_7$ pulse from the computer clock generator, is read into the sector address register. When the address in the sector counting register coincides with this address, there will be no output signals from the exclusive OR circuits because each exclusive OR circuit will be presented with input signals of the same sense. As a result, NAND circuit 426 will be enabled to produce an output signal which causes flip flop 441 to be set to ONE for writing, provided that the synchronizer circuit is properly conditioned.

The function of the synchronizer circuit is to inhibit word transfers until after the occurrence of a $T_{10}$ pulse. For example, should entry of the desired sector address into the sector register take place while the count corresponding to this address is standing in the counting register but sometime after the sector pulse which gave rise to the count has occurred, a "late" transfer of the first word of data to the disc, which might occur otherwise, will be prevented. This function is carried out as follows. Flip flop 432 is set to ONE in response to a $T_{10}$ pulse on line 437. Flip flop 431 is set to ONE by the first sector pulse which occurs subsequent to the setting of flip flop 432. With flip flop 431 in the one state and NAND circuit enabled, AND circuit 428 is enabled to produce an output signal for conditioning of gate 434. This permits the sector pulse which gave rise to the proper count in the sector counting register to pass gate 434 and set the flip flop 441 to ONE. Also, this sector pulse, by virtue of the delay introduced by delay unit 435, is adapted to perform a resetting function upon the flip flops 431 and 432. The resetting of write flip flop 441 to ZERO to terminate the word transfer is occasioned by a pulse on 432, the program counter overflow line. Such a pulse signifies the end of the word block.

FIGURE 5 illustrates the word transfer mechanism itself for transferring data from the computer to the disc, the implementation of transfers from disc to computer being essentially the same except that the roles of the write circuits and *I/O* register are interchanged. As shown in FIGURE 5, the signal for writing, which is derived from the flip flop 441 just described, is used to condition a gate 551 to pass transfer pulses on a line 550 to a series of gates 552–555. The transfer pulses determine the precise time of the transfer to the disc memory of the first and subsequent words of digital data. The manner in which these transfer pulses are derived will be explained in detail in connection with FIGURE 7. Suffice it to say at this point that the pulses are produced in timed relation to the clock pulses from the clock pulse track of the disc by means of control circuitry 13 which is enabled when a transfer to the disc is called for, a transfer to the disc being called for by one of the bits accompanying the disc sector address.

In operation, gates 552–555 are conditioned in accordance with the senses of the bits in the *I/O* register and in response thereto pass pulse signals to the write circuits associated with the individual data tracks of the disc. The pulses are passed by way of OR circuits 556–559, one for each gate and corresponding data track. The OR circuits each have two input circuits, one of which is supplied with the aforementioned pulses from the gates 552–555, and the other of which is supplied with pulses from a line 561 by way of a gate 562. Gate 562 is enabled in like manner as gate 551. The pulses on line 561 emanate from the disc clock generator and occur midway in the intervals between transfer pulses. In this way, flux changes are produced in the data tracks contemporaneous with each clock pulse on the line 561 without regard to the senses of the bits derived from the *I/O* register. Flux changes are also produced at times substantially coincident with the transfer pulses in response to ONE bit signals transmitted by gates 552–555 and OR circuits 556–559. Thus, a ONE bit is signified, in effect, by a double frequency flux change, which is the type of signal storage scheme employed in the disc memory as aforementioned.

Figure 6:
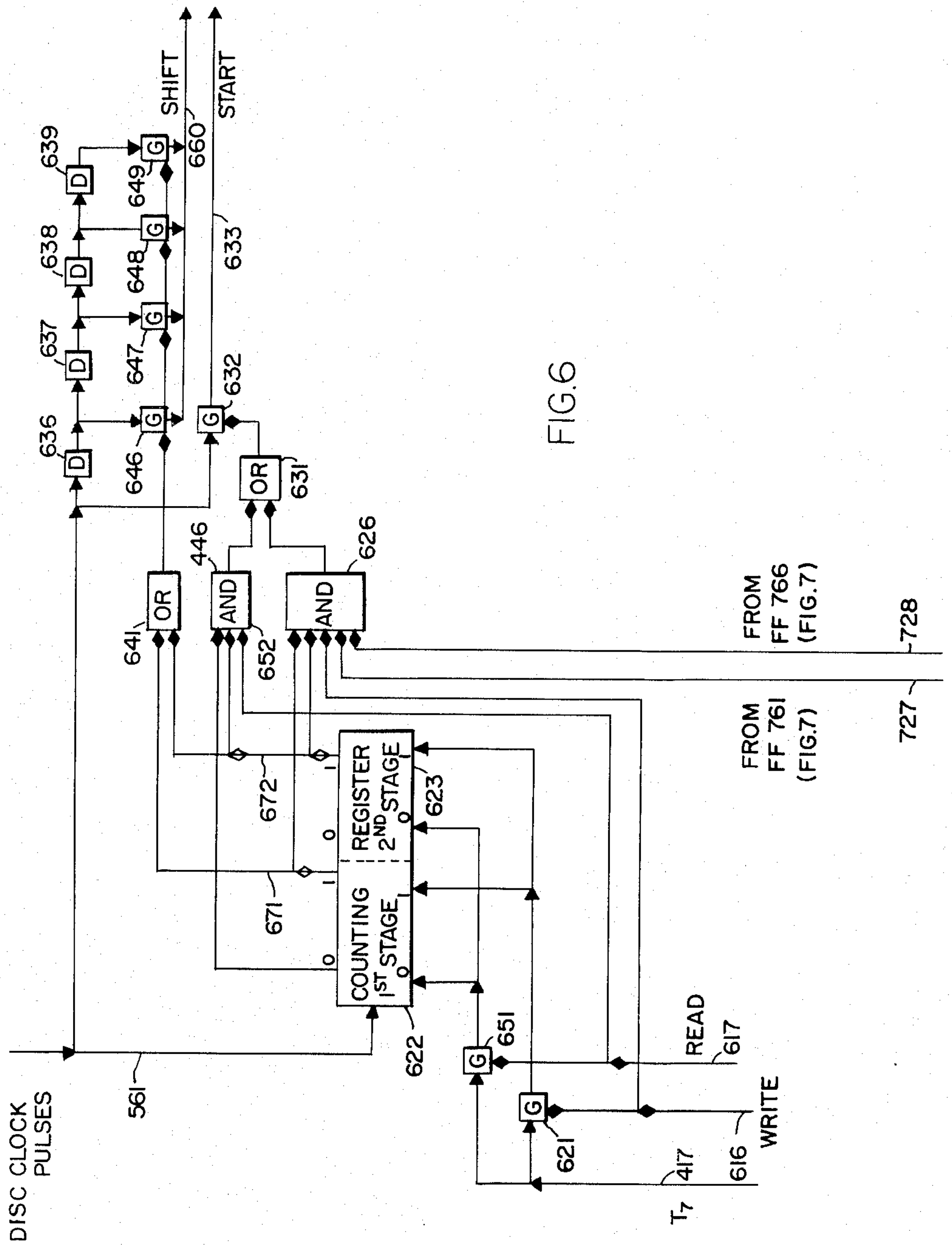
FIGURE 6 is a logical block diagram of a portion of the timing circuitry incorporated in the system.
Figures 7, 8, 9:
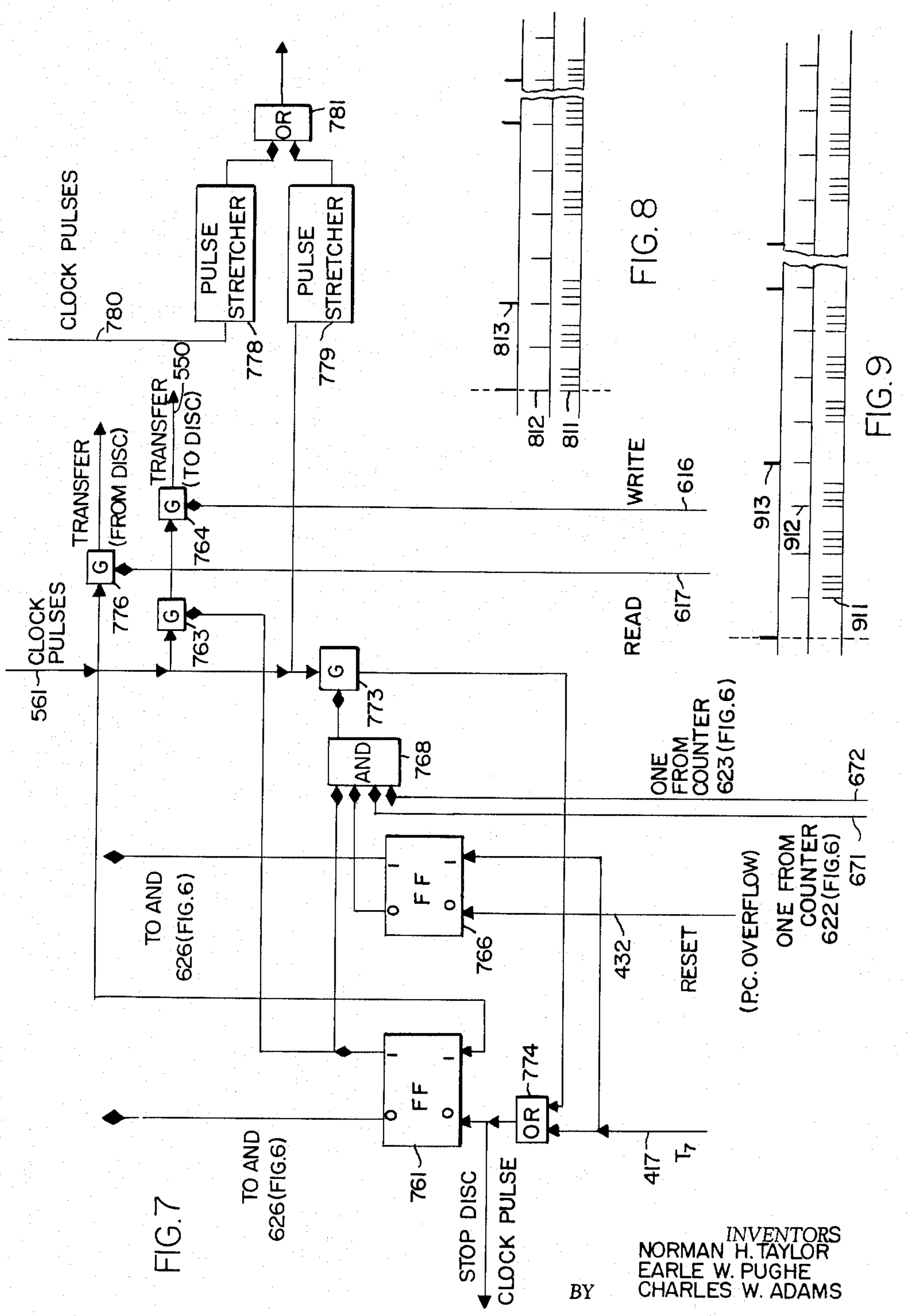
FIGURE 7 is a logical block diagram of another portion of the timing circuitry.
FIGURES 8 and 9 are timing diagrams illustrative of the relative times of occurrence of certain timing pulses which are used to cause transfers from the disc to computer memory and from computer memory to the disc, respectively.

FIGURES 6 and 7 illustrate the control circuitry whereby a transfer a data from the computer to the disc (and vice versa) is appropriately timed. In this regard, it will be recalled that data is handled by the computer in the form of relatively long words whereas the disc is adapted to accept (or supply) only four bits of data at a time. To reconcile these characteristics of the computer and the disc, respectively, a sixteen bit word length is used in the computer but only the right four bit positions of the computer *I/O* register are examined. To read the bits in the other twelve active *I/O* register positions, shift pulses 911 are provided to shift the bits to the right four times in rapid succession subsequent to each reading operation. A specific function of the control circuitry of FIGURES 6 and 7, therefore, is to generate the required trains of four shifts pulses together with periodic transfer pulses that are appropriately timed with respect to the shift pulses.

FIGURES 8 and 9 illustrate the timing relation of these pulses when data is being transferred from the computer memory to the disc (FIGURE 9) and when data is being transferred from the disc to computer memory (FIGURE 8). In FIGURES 8 and 9 the shift pulses are designated by the respective numerals 811, 911 and the transfer pulses are designated by the respective numerals 812, 912. With periodic exceptions, each transfer pulse is followed shortly by a train of four shift pulses. Thus, whenever new data has been entered in the *I/O* register, the bits in the right four positions are read first, then the bits in the adjacent four positions are shifted into the right four bit positions and read, and so forth until the bits which were originally in the left four positions have been read. As this completes the transfer operation, no further shift operations are required until a new word has been entered in the register and the bits of the new word in the right four bit positions have been read. That is to say, the first four bits of a new word are read as they stand, without shifting. For this reason, no shift pulses are generated in the intervals between every fourth transfer pulse and the first transfer of the next cycle as shown.

The circuitry of FIGURES 6 and 7 also generates start pulses designated 813 and 913. In response thereto a word of data is obtained from the computer memory and transferred to the *I/O* register and vice versa. In the write (on disc) mode, the first start pulse is generated in advance of the first transfer pulse by an amount corresponding approximately to the period between transfer pulses. This allows time for the transfer operation to take place and the *I/O* register to settle before the reading process is begun. The remaining start pulses are generated in time coincidence with every fourth transfer pulse to initiate replacement of the words in the *I/O* register even while the last four bits thereof are being read.

In the read (from disc) mode, start pulses begin after the transfer pulses. The reason for this is that a word must be read from the disc into the *I/O* register four bits at a time before the word can be read from the *I/O* register into the computer memory in response to a start pulse. This would suggest that the first start pulse should follow the fourth transfer pulse. In fact, it is produced at the time of the third transfer pulse to allow for the inherent delay in the computer between the time a start pulse is received and reading of the *I/O* register is initiated.

In FIGURE 6 the line designated 616 provides signals to indicate that the disc is to be written upon, while the opposite condition, namely that data stored on the disc is to be read into the computer, is specified by signals on line 617. These signals are derived selectively from one of the stages of the sector address register 411 of FIGURE 4. Reading and writing operations are begun in response to a pulse on line 417, and are carried out in timed relation to a continuous train of clock pulses on line 561. As described previously, the pulses on line 417 are derived from the computer clock generator at time $T_7$. The pulses on line 561 are derived from the disc clock generator and will be referred to hereinafter as clock pulses.

When a writing (upon the disc) operation is called for by a pulse on line 616, and a $T_7$ pulse on line 417 occurs, a gate 621 is conditioned to pass the $T_7$ pulse to the ONE inputs of a scale of four counting register having two stages 622 and 623. As a result, both stages are set to ONE and the ONE output signals enable an AND circuit 626 to produce an output signal. Actually, signals on a pair of lines 727 and 728 are also required to enable the AND circuit but these will normally be present at this time anyway by reason of the occurrence of the $T_7$ pulse. This will be explained more fully in connection with the description of FIGURE 7 hereinafter.

The signal from AND circuit 626 is passed by way of an OR circuit 631 to the conditioning line of gate 632. Gate 632 is sensed by the clock pulses so that the clock pulse next succeeding the $T_7$ pulse which sets both the counting register stages to ONE is passed by the gate 632 to a line 633. It is from the line 633 that the start pulses are obtained.

To produce the shift pulses, four DELAY circuits 636–639 are connected in cascade to the clock pulse line 561. The individual outputs of the DELAY circuits, in turn, are connected to the sensing inputs of respective gates 646–649. The outputs of gates 646–649 are connected in common to a line 660 which provides the shift pulses. Gates 646–649 are conditioned by a signal which is a logical OR function of the ONE output signals from the two counting register stages. This function is performed by an OR circuit 641.

Line 561 which provides the disc clock pulses is also connected to the incrementing input of the counter so that the same clock pulse which is responsible for the first start pulse also serves to add ONE to the counter. As a result, the counter is changed from 1,1 to 0,0 which deconditions the gates 646–649 before the initial clock pulse arrives by way of DELAY 636. Hence, this initial clock pulse is not passed by these gates and no shift pulses are produced. In response to the next clock pulse, however, the count is changed, to 1,0 and the gates are conditioned by the ONE output of the first counting register stage. As this clock pulse traverses the respective delays, one after the other, it senses the gates 646–649 which in turn serve to produce a train of four shift pulses. The same mode of operation obtains in response to the next two clock pulses. Upon the occurrence of every fifth clock pulse, however, the counting register will be set to 0,0 as in the case of the first clock pulse, so that the shift pulses are effectively suppressed until the next succeeding clock pulse.

A similar mode of operation obtains in the read (from disc) mode except that the counting register is initially set to 0,0 by the $T_7$ pulse and not until the occurrence of the third succeeding clock pulse is a start pulse produced. A gate 651 is used to pass the $T_7$ pulse to set the counter to 0,0 initially, and an AND circuit 652 is used to condition the gate 632 when the count changes to 0,1. Although the count will be changed to 0,1 by the second clock pulse, it will not be so changed, and the gate 632 conditioned by the time the gate is sensed. This is the reason why a start pulse is not produced until the third clock pulse occurs. On the other hand, the first train of shift pulses is produced in response to the first clock pulse for the reason that the delay produced by DELAY circuit 636 is sufficient to permit the counting register to change to 1,0 and gate 632 to be conditioned by the time the gate is sensed.

The portion of the clock generator circuitry which is primarily concerned with the generation of transfer pulses is shown in FIGURE 7. From FIGURE 7 it will be observed that the line 417 which carries $T_7$ pulses is coupled to the ZERO input of a flip flop 761 by means of an OR circuit 774. The ONE input of flip flop 761 is connected to line 561 which carries the disc clock pulses, while the ONE output of flip flop 761 is used to condition a gate 763 which is sensed by the disc clock pulses. Clock pulses passed by gate 763 are used to sense a gate 764 which is conditioned by the write line 616. The output of gate 764 supplies transfer pulses to the line 550 in the write (on disc) mode of operation.

Another flip flop 766 is provided in the circuitry of FIGURE 7, flip flop 766 having its ONE input connected to the $T_7$ pulse line 417 and its ZERO input connected to the line 432 emanating from the computer program counter. Signals on line 432 are used to reset the clock generator circuitry. The ZERO output of flip flop 766 and the ONE output of flip flop 761 are connected to the input side of an AND circuit 768 as are lines 671 and 672. Lines 671 and 672 correspond to the ONE output lines from the counting register in FIGURE 6. The output signal from AND circuit 768 conditions a gate 773 which is sensed by clock pulses on line 561. The clock pulses passed by gate 773 are, in effect, transmitted by OR circuit 774 to the ZERO input of flip flop 761. Finally, a gate 776 is provided to convert clock pulses into transfer pulses in the read (from disc) mode of operation. Gate 776 is conditioned by signals on line 617, the same read line as was described in connection with FIGURE 6.

In operation, the flip flops are initially set to 0,1 by the $T_7$ pulse and thereafter flip flop 761 is set to ONE by the first clock pulse. In the read (from disc) mode, gate 763 is conditioned at this time so that the first and all subsequent clock pulses produce a transfer pulse. However, in the write (on disc) mode, this first clock pulse is not passed by the gate 763 because of the switching time required for the flip flop 761 to produce a level on the ONE output line which is used to condition the gate. Accordingly, in the write mode, transfer pulses are produced in time coincidence with the second and all succeeding clock pulses until the reset line is pulsed.

In response to a pulse on reset line 432, flip flop 766 is set to ZERO and AND circuit 768 is enabled as soon as the counter of FIGURE 6 reaches 1,1. Gate 773 is then conditioned by the output signal from AND circuit 768 to pass the next clock pulse to the ONE input of flip flop 761 by way of OR circuit 774. This, in effect, shuts off the disc clock after the last word has been read out of the computer *I/O* register.

In the write (on the disc) mode, the clock pulses cease just before the end of the interpulse period between start pulses so that following the last start pulse that is generated, four transfer pulses will be produced with three trains of shift pulses between them. In this way, the bits in the *I/O* register are alternately read and shifted until all the bits of the word that has been entered in the register by the last start pulse have been read. In the read (from the disc) mode, one start pulse and then one transfer pulse is generated just before the clock pulses cease, with one train of shift pulses preceeding the last transfer pulse. As all but the last three bits in the register will have been read out by this time, there is no need to provide additional transfer and shift pulses.

Pulse stretchers 778 and 779 produce signals of overlapping duration in response to respective clock pulses on lines 561 and 780. The pulses on line 780 are derived from the same source as those on line 561, namely the disc clock generator, but they occur midway in the interval between the pulses on line 561. A signal which is an OR function of the "stretched" clock pulses is produced by OR circuit 781. This signal is used to enable the beam of the cathode ray tube display to write on the tube screen only when the clock pulses are present in order to prevent damage to the screen that might otherwise occur if the clock pulses accidently terminated and the CRT beam remained stationary as a result.

Figure 10:
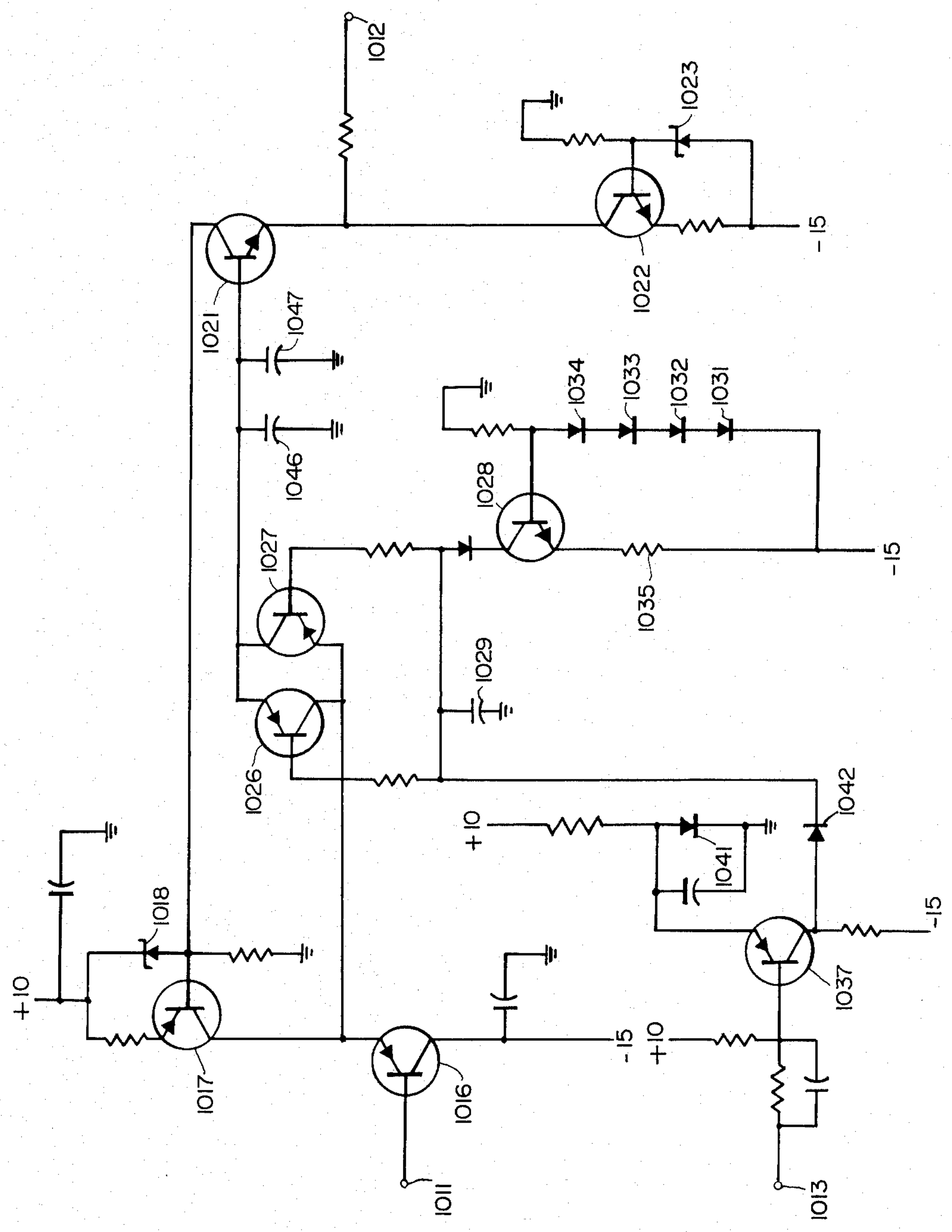
FIGURE 10 is a schematic diagram of the sample and hold circuit employed in the system.

FIGURE 10 illustrates schematically a form of sample and hold circuit 23 or 24 (FIGURE 1) suitable for use in the system according to the present invention. The input terminal for analog signals is designated 1011 in FIGURE 10 and the output terminal is designated 1012. Terminal 1013 serves as the input for timing signals in response to which the value of the deflection voltage is caused to hold temporarily at a relatively constant value independent of fluctuations in the input signal voltage. In this regard, it will be understood that the respective circuits formed with these terminals include connections to a common point or ground.

Transistor 1016 which is coupled to input terminal 1011 is arranged in an emitter follower configuration. Its function is to match the impedance of the source of the input signal voltage, namely the digital-to-analog converter 21 or 22 to that of the sample and hold circuit proper. Transistor 1017 provides a constant emitter current to transistor 1016 and to this end, a zener diode 1018 is connected between the emitter voltage source and the base of transistor 1017 to maintain the base potential at a relatively constant value.

Transistor 1021 is also connected in an emitter follower configuration for the purpose of providing a match to the deflection circuitry 26 or 27 (FIGURE 1). As shown, transistor 1021 has its collector connected in common with the base of transistor 1017 to diode 1018. Emitter current for the transistor 1021 emanates from a regulated source including transistor 1022. The base of transistor 1022 is maintained at a constant potential by means of a zener diode 1023.

In effect, the input and output circuit emitter followers are interconnected by a switching circuit formed with transistors 1026 and 1027 which are normally maintained in a conductive state corresponding to a closed circuit condition. Transistors 1026 and 1027 are under the control of transistors 1028 and 1037. The former acts to place the transistors 1026 and 1027 in a conductive state by charging of a capacitor 1029 which may actually comprise the aggregate of a number of stray wiring capacitances. Included in this charging circuit are a group of series connected diodes 1031–1034, between the base terminal and emitter load resistor 1035. The opposite state obtains corresponding to an open circuit condition when the capacitor 1029 is discharged by the circuit formed with transistor 1037 in response to a timing signal supplied by way of terminal 1013. Included in this circuit is a silicon diode 1041 and a germanium diode 1042. The former is connected between emitter and ground so that the emitter potential will remain relatively constant. The latter is connected between the collector and the capacitor 1029 to form a conductive path through which the capacitor is discharged when a timing signal occurs.

The precise mechanism whereby the transistors 1026 and 1027 are turned off so that the output voltage becomes independent of the input signal voltage is as follows. Normally, transistor 1037 is biased to cut off. However, in response to a negative pulse at terminal 1013, which by way of example may have a magnitude of minus three volts and a duration of approximately seventy millimicroseconds, transistor 1037 is caused to conduct momentarily. When transistor 1037 conducts, its collector assumes a slightly positive potential so that germanium diode 1042 is no longer back biased and a low impedance path for the discharge of capacitor 1029 is established.

Once capacitor 1029 is substantially discharged, the base potentials of the transistors 1026 and 1027 will be very nearly at ground which cuts them off and effectively isolates the input terminal 1011 from the output terminal 1012. At this time, the output voltage between terminal 1012 and ground is maintained relatively constant by capacitors 1046 and 1047.

Upon cessation of the pulse at terminal 1013, transistor 1037 ceases to conduct and germanium diode 1042 once again becomes back biased, so that the low impedance path for the discharge of the capacitor 1029 no longer exists. Instead, capacitor 1029 is recharged by the transistor 1028 and transistors 1026 and 1027 are once again turned on. With transistors 1026 and 1027 in a conductive state, input and output terminals 1011 and 1012 are closely coupled so that once again also the magnitude of the output signal between terminal 1012 and ground will be representative of the input signal value. At this time, the input signal will have assumed a new stable value which will endure until new digits are entered in the register associated with converter 21 or 22 (FIGURE 1).

Although the invention has been described in terms of a single embodiment, those skilled in the art will recognize that various modifications of and alternatives to this embodiment that are within the spirit and scope of the invention are possible. Therefore, the invention should not be deemed to be limited to the details of what has been described herein by way of illustration, but rather it should be deemed to be limited only to the scope of the appended claims.

What is claimed is:

1. In an electronic display system for displaying digitally encoded data, the combination including:
means to register at recurrent intervals digital signals representative of the data,
means to convert said digital signals into analog signals,
a cathode ray tube,
sampling means interposed between said conversion means and said cathode ray tube to sample said analog signals during said intervals to provide a succession of fixed signal levels corresponding thereto, and
means to produce on the cathode ray tube screen a continuous trace of the variations in said levels.

2. In an electronic display system the combination including a cyclic memory device to record digital signals representing graphical data, means to repetitively read said digital signals from memory a group at a time,
means to convert said digital signals to analog signals,
a cathode ray tube,
sampling means interposed between said conversion means and the cathode ray tube to repetitively sample said analog signals at the same rates as digital signals are read from memory and to provide a succession of fixed signal levels corresponding thereto, and
means to produce on the cathode ray tube screen a continuous trace of the variations in said levels.

3. In an electronic display system including a cathode ray tube for displaying graphical data, the combination including:
a decoder to derive signals characterizing segmental portions of a line and signals characterizing the origin of the line from a fixed number of binary bit signals,
means to selectively specify said signals characterizing the origin of the line and the signals characterizing segmental portions of the line,
register means to store signals characterizing the origin of the line in terms of a set of digits,
said register means comprising a first multi-stage register whose contents specify horizontal deflections of the cathode ray tube beam and a second multi-stage register whose contents specify vertical deflections of the cathode ray tube beam,
means to enter signals in said register means characterizing segmental portions of said line in terms of increments to said set of digits,
a digital-to-analog converter to convert the digital signals in said register to analog signals, and
means to control the deflection of said cathode ray tube beam in accordance with said analog signals.

4. The combination according to claim 1 including means to convert said digital signals into control signals for controlling the intensity of the cathode ray tube beam.

5. The combination according to claim 4 wherein said means to register digital signals includes
a first multi-stage register whose contents specify horizontal deflections of the cathode ray tube beam, and
a second multi-stage register whose contents specify vertical deflections of the cathode ray tube beam.

6. The combination according to claim 5 wherein said means to register digital signals includes
a decoder to derive from combinations of said digital signals, input signals to selected stages of said registers.

7. In an electronic display system including a cathode ray tube for displaying graphical data, the combination including
means to accumulate first digital signals characterizing line segments and to provide second digital signals representing cumulative totals of the digits defined by said first digital signals,
means to convert said second digital signals to analog signals, and
means to produce segmental deflections of the cathode ray tube beam in response to said analog signals.

8. The combination according to claim 7 wherein said means to accumulate first digital signals includes
a pair of multi-stage registers each having a plurality of bistable devices, and
first circuit means to selectively alter the states of said devices to reflect increments to the contents of the register in response to said first digital signals.

9. The combination according to claim 8 wherein each of said registers include
second circuit means to control the state of a selected one of said bistable devices in response to said digital signals and to transpose the states of said devices.

10. The combination according to claim 9 including decoder means to derive first digital signals having weights from combinations of unweighted binary digital signals.

11. The combination according to claim 10 wherein said means to produce segmental deflections of the cathode ray tube beam includes
a sample and hold circuit.

12. The combination according to claim 3 wherein said means to control the deflection of said cathode ray tube beam includes
a sample and hold circuit.

13. The combination according to claim 2 including an electronic digital computer to provide said digital signals representing graphical data.

14. The combination according to claim 13 including circuit means to transfer selected digital signals from said memory device to said computer.

15. The combination according to claim 14 including means to derive weighted binary signals from said digital signals.

16. The combination according to claim 15 including
a pair of multi-stage registers each having a plurality of bistable devices, first circuit means to selectively alter the states of said devices to reflect increments to the contents of the registers in response to said weighted binary signals, and
second circuit means to control the states of a selected one of said bistable devices in response to binary signals of a selected weight and to transpose the states of said devices.

References Cited by the Examiner

UNITED STATES PATENTS

| | | | |
|---|---|---|---|
| 2,594,731 | 4/52 | Connolly | 235—171 |
| 2,850,723 | 9/58 | McNaney | 340—324 |
| 2,902,684 | 9/59 | Mark | 340—324 |
| 2,959,349 | 11/60 | Marsh et al. | 235—92 |
| 3,111,643 | 11/63 | Alstyne et al. | 340—324 |

MALCOLM A. MORRISON, *Primary Examiner.*